Figure 1:
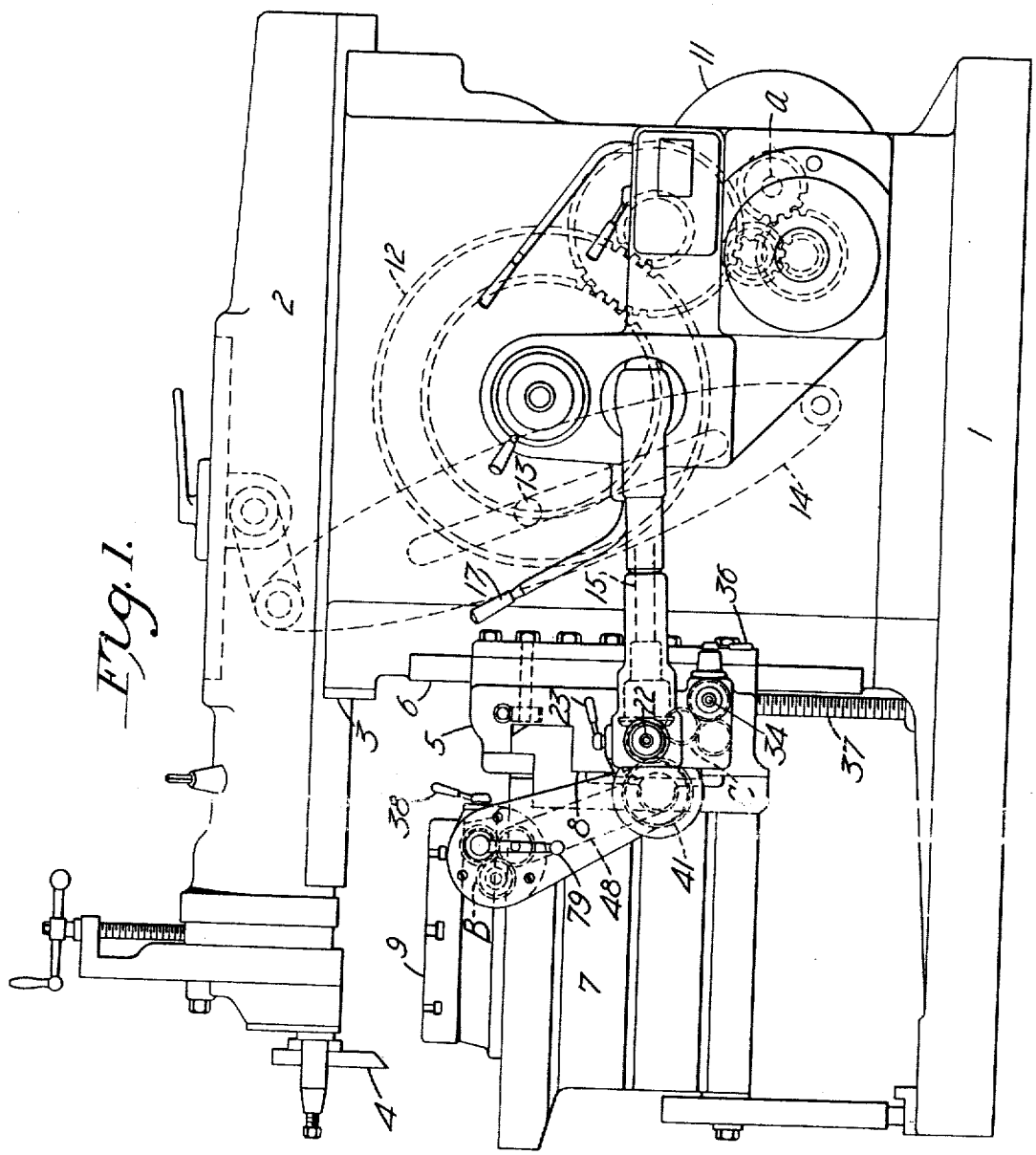

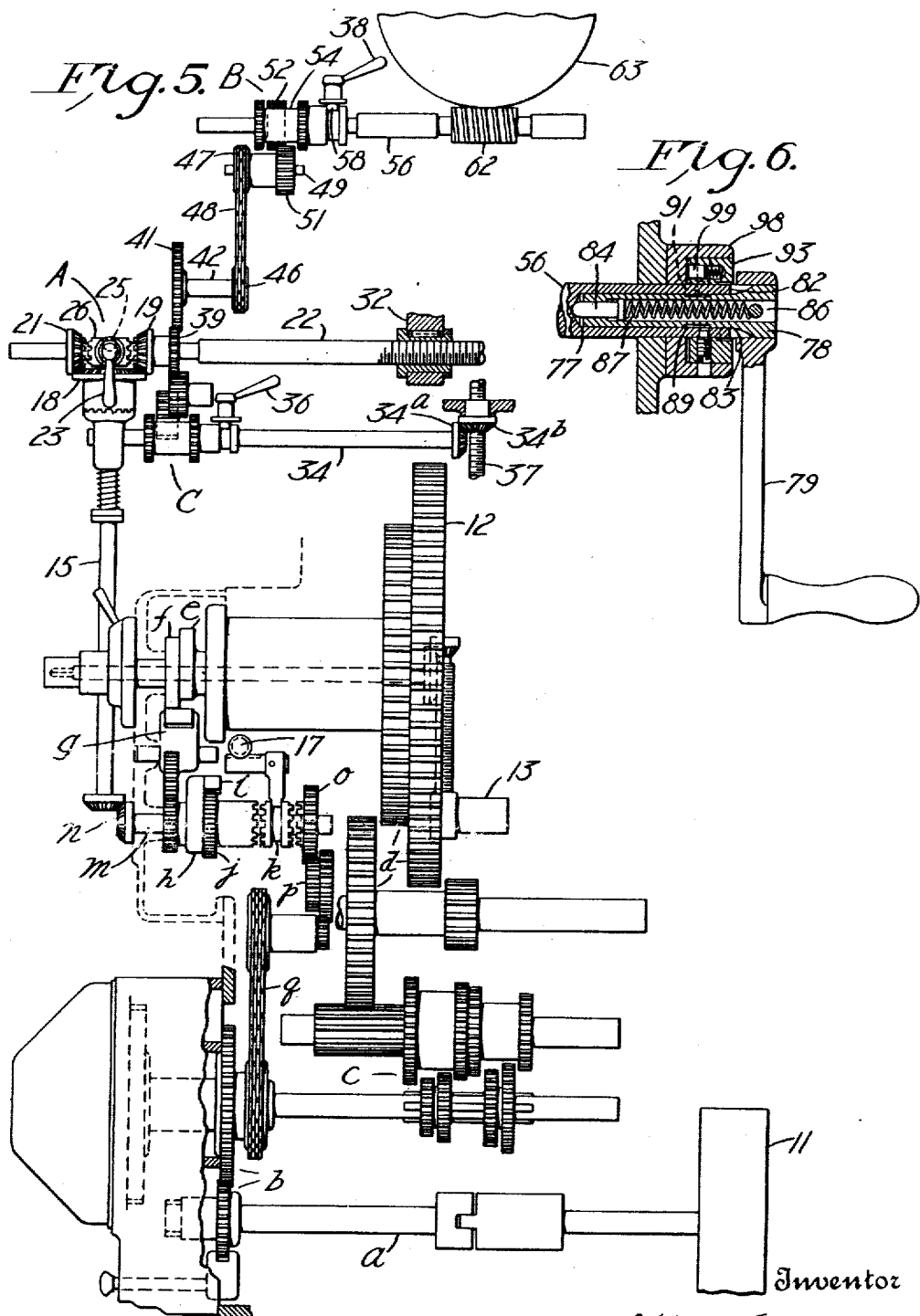

Patented May 29, 1934

UNITED STATES PATENT OFFICE 1,960,567

CIRCULAR TABLE DRIVE FOR SHAPERS

William F. Zimmermann, Maplewood, N. J., assignor to Gould & Eberhardt, Newark, N. J., a corporation of New Jersey Application June 18, 1931, Serial No. 545,260

12 Claims. (Cl. 90—38)

This invention concerns machine tools, particularly of the shaping machine class, and relates more specifically to improvements in rotary attachments and work tables therefor.

It has for its primary object to provide such machines with a power operated rotary device that may, with ease and rapidity, be attached to the work support of a standard machine so as to be rotatable or indexible about a horizontal or vertical axis in timed relation with the reciprocations of the shaper ram.

A further object of this invention is to arrange a drive means for a rotary carrier in a manner whereby the carrier may be driven by power in reverse directions continuously or intermittently either alone or in combination with horizontal or vertical movements of the conventional work support.

Still another object of this invention is to provide a common source of power with branch transmissions for the carrier rotating means and for the carrier translating means and install in each of the branch transmissions, reversing mechanisms for effecting independent and selective reversals of the separate trains of mechanisms and to provide in the common transmission mechanism a master reverser for effecting selective reversals, accompanied by a change in rate, of one or more of the branch trains.

In carrying out the objects of this invention, it is proposed to mount a rotary table, for example, on an individual base or pedestal and to arrange a drive therefor connectible with the feed mechanism, so that the table as a unit, may be detachably secured to the conventional work support or saddle of a standard machine. In this branch train independent reversing means, of the sliding-gear type, are incorporated in order that the direction of rotation of the table may be changed independently of the table feed transmission mechanisms and irrespective of the direction of movement of the main drive shaft that is common to all. And as a further refinement to incorporate in the main drive an auxiliary reverser and rate changing mechanism for effecting, by the actuation of a single lever, reversals in the direction of rotation of the rotary table or in the horizontal or vertical movement thereof simultaneously while at the same time changing the motion from an intermittent feed rate to a continuous rate, or conversely.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
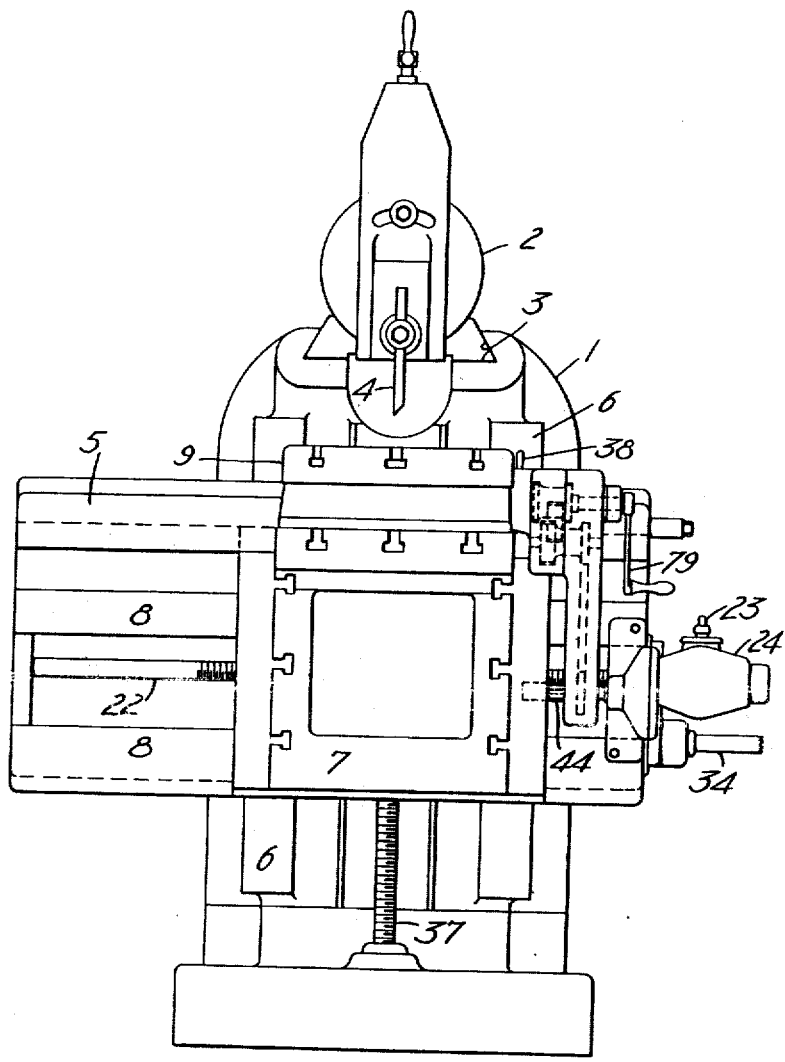
Figure 3:
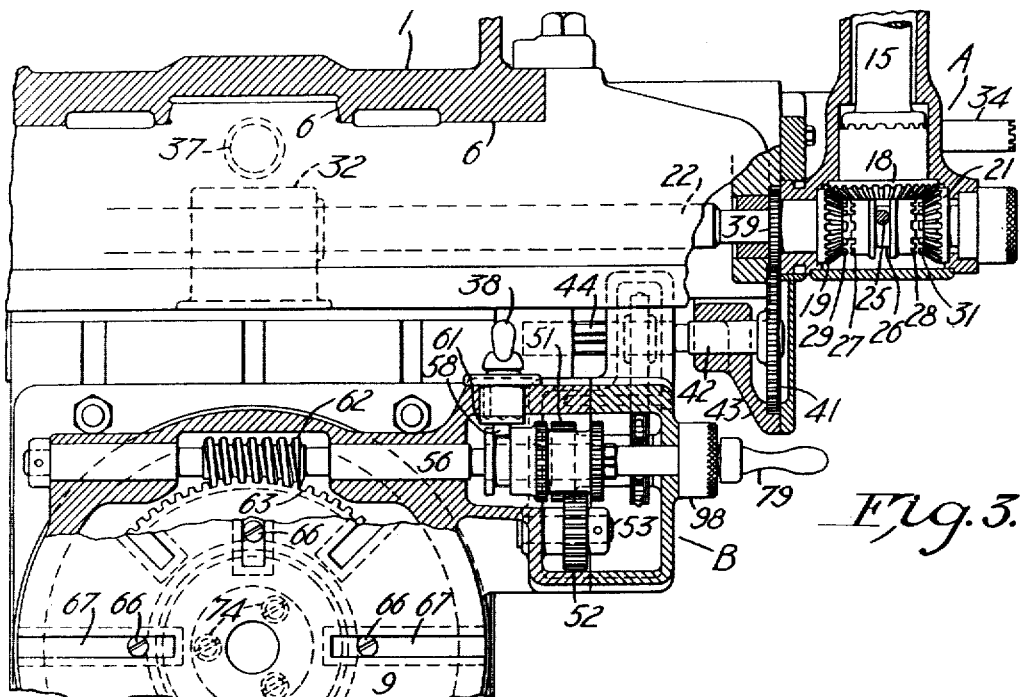
Figure 4:
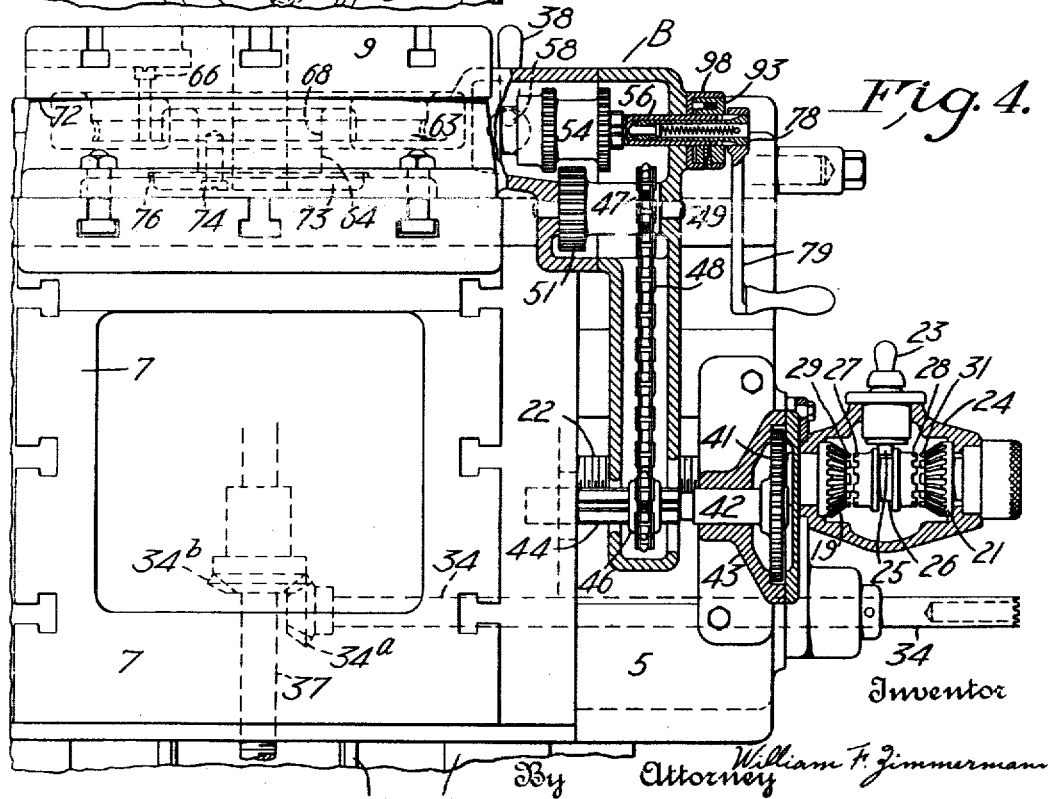

Figure 1 is a side elevation of a shaping machine embodying this invention. Fig. 2 is an end view thereof. Fig. 3 is an enlarged plan view of a portion of the rotary work-table and its driving connections. Fig. 4 is an elevational view partly in section further illustrating the table driving means. Fig. 5 is a diagrammatic development of the essential portions of the entire transmission mechanisms. Fig. 6 is an enlarged view of the safety manual actuator.

Referring to the drawings, numeral 1 represents the frame of a shaping machine upon which a ram 2 is reciprocably mounted on the guideways 3 and carries a cutting tool 4. A cross rail 5 slidably mounted upon vertical guideways 6 of the frame 1, supports a rectangular work support 7, translatably mounted upon horizontal ways 8 formed on the rail.

Power to reciprocate the ram 2 is derived from a motor 11, or other prime mover, and enters the machine at the rear thereof through the drive shaft $a$, thence through the change gear sets indicated generally as $b$, $c$ and $d$ to the large bull gear 12. One face of the bull gear 12 carries a pivot block 13, radially adjustable thereon, which engages guideways formed in a rocker arm 14 and provides the means for oscillating the lever 14 thereby reciprocating the ram as the bull gear is rotated, the ends of the arm being pivotally connected with the ram and main frame respectively.

Power for operating the table feed and indexing mechanisms is taken from the ram reciprocating mechanism so that the feeding movements of the table is effected in timed relation with movement of the ram, as follows. Attached to the outer end of the hub of the bull wheel are two cams $e$ and $f$, one of which is adjustable relative to the bull wheel. The fixed cam is adapted, upon rotation, to engage and oscillate a sector shaped rocker arm $g$ that has a toothed connection with a pawl carrying element $h$. The pawl $i$ engages the ratchet teeth formed on a clutch element $j$ and each time the ram 2 recedes the fixed cam $e$ rocks the lever $g$ so as to advance the pawl and ratchet wheel a predetermined distance. The amount of oscillation imparted to the lever $g$ is variable according to the setting of the adjustable cam $f$ which limits the return movement of the rock arm to any given point.

The ratchet wheel $j$ is provided with clutch teeth and when the clutch spool $k$ is engaged therewith the intermittent movements imparted to the wheel are transmitted to the shaft $m$, bevel gears $n$, to a feed shaft 15 that operates the table feed and indexing mechanisms.

Continuous motion may be imparted to the shaft 15 by shifting the clutch $k$ to the right (in Fig. 5) so as to connect the shaft $m$ with a gear $o$, the gear $o$ being driven continuously from the main transmission by means of the gears $p$ and chain and sprocket connections $q$.

To govern the movements of the connecting shaft 15, a control lever 17 is provided, adapted to shift the clutch spool $k$ to maintain the shaft in a neutral or stationary position and also to cause it to be rotated in an intermittent feed rate in a timed relation to the reciprocations of the ram, and upon moving the handle and spool in the opposite direction, the shaft is caused to be rotated at a constant or rapid traverse rate and in a direction opposite to its intermittent feed movement.

Referring to Fig. 3, the reversing mechanism for the table cross feed branch transmission is indicated generally as "A" and consists of a bevel gear 18, secured to the forward end of the connecting shaft 15, and constantly in mesh with two bevel gears 19 and 21 that are loosely mounted upon a horizontal feed screw shaft 22. To enable the operator to rotate the shaft 22 in either forward or reverse directions at a given rate, and also to maintain it in a neutral position, a control lever 23 mounted upon the bracket housing 24 has attached thereto a shifting fork 25 which engages a shiftable clutch member 26 splined to the feed screw 22. The ends of the clutch spool are provided with clutch teeth 27 and 28 adapted selectively to engage clutch teeth 29 and 31 formed upon the bevel gears 19 and 21 respectively. To effect horizontal movement of the rectangular work support 7, the feed screw 22 is engaged with a nut 32 carried by the work support. Suitable detent means are provided for holding the lever 23 in its various operative positions.

It is to be noted at this point that the position of the lever 23 indicates the direction of cross feed, that is, if the lever be positioned to the left or toward the machine, the feed will be in that direction; but if the lever be positioned to the right the table will feed to the right. However, regardless of whether the table is feeding to the left or to the right the shifting of the clutch spool $k$, by means of the lever 17, from its feed position to its traverse position, the direction of table movement will not only be reversed but will be moved at a rapid traverse rate. This is particularly advantageous when the operator desires to take cuts up to a given line or point for under such conditions the operator can, by the shifting of a single lever, stop the forward feed and throw in a reverse rapid traverse and move the work clear of the tool at a rapid rate. To start the forward feed again, only the rate and direction control lever is moved to its "feed" position, the direction control lever 23 mounted upon the rail remains as previously positioned, unless, however, a change in the direction of feed is desired.

With reference to Figs. 3 and 4, the power drive to the rotary table 9 is likewise derived from the drive shaft 15 and which through a reversing mechanism "B" drives the table 9 in reverse directions in the following manner. Integral with the bevel gear 19 is a spur gear 39 that meshes with a gear 41 fixed upon a shaft 42 journaled in bearings provided by a bracket 43. Slidably mounted upon a splined portion 44 of the shaft 42 is a sprocket wheel 46 connected with a sprocket wheel 47, loose upon a shaft 49, by a chain belt 48. Integral with the wheel 47 is a wide-faced gear 51 which is constantly in mesh with a wide-faced idler gear 52 loosely mounted on a stub shaft 53 secured to the table frame. A double gear unit 54, splined to a worm shaft 56 is adapted to mesh with either of the gears 51 or 52 thereby to revolve the worm shaft in forward or reverse directions. A shifting fork 58 actuated by a control lever 38 mounted upon the table frame controls the position of the sliding gear unit 54.

Similar to the control lever 23, the lever 38 is capable of being moved to three distinct positions, causing one of the gears of the double gear unit 54 to mesh with one of the gears 51 or 52 to effect changes in the direction of rotation of the shaft 56, and also to a neutral position where the double gear unit is disengaged from both of the gears 51 and 52. Detent means, such as a spring pressed pin is adapted to engage detents in a plate 61 for holding the lever 38 in adjusted position.

The engagement between the worm shaft 56 and the rotary table 9 is provided by a worm 62 secured upon the shaft 56 and worm gear 63 that is secured to the underside of the work table 9 by suitable screws 66 accessible through T-slots 67 in the face of the table. The support for the hub portion 64 of the table is provided by the bearing surface 68 formed in the pedestal whereas the downward stresses are transmitted to an annular peripheral bearing surface 72 also provided by the pedestal. Upward movement of the table 9 is prevented by means of a plate 73, secured to the cylindrical hub 64 by bolts 74, and which rests within a recess 76 and engages the underside of the base. Although the work carrier herein depicted revolves about a vertical axis it is obvious that it may be arranged to move about a horizontal axis or an inclined axis if the nature of the work demands, and it has been thought, therefore, unnecessary to illustrate herein all the adaptations in which this invention is susceptible of being used.

For certain operations it is desirable that the rotary table be held stationary and in this event the table reversing mechanism, indicated generally at B, is thrown into its neutral or intermediate position by means of the control lever 38. The irreversible drive it will be noted, through the worm and worm wheel 62 and 63 respectively, thus locks the table in any preselected angular position.

As shown in Fig. 1, the vertical movement of the cross rail is derived from power taken from the drive shaft 15 and transmitted to an elevating screw shaft 34 in reverse directions by means of a third reversing mechanism "C". A control lever 36 is provided whereby the shaft 34 may be independently operated in forward or reverse directions or maintained in a stationary position. Secured to the elevating shaft 34 is a bevel gear 34$^a$ that meshes with a gear formed upon a rotatable nut 34$^b$ threaded upon a stationary screw shaft 37. Inasmuch as vertical adjustments of the table are ordinarily effected at a traverse rate, the position of the lever 36 indicates the direction of vertical movement. For example, when it is pointing upward, the movement of the rail is upward, and when pointing downward, the movement is correspondingly reversed.

For certain other operations it is desirable that the table be indexed a given amount and then translated vertically or horizontally. Under these conditions the reverser B is moved to neutral when the desired degree of angularity is reached and either one or both of the reversing mechanisms A or C actuated, simultaneously or successively, to effect the desired movement of the table 9. At the completion of the tooling operation the table is adapted to be moved quickly away from the tool, simply by shifting the rate and direction control lever 17 to the traverse position. This movement of the lever 17 changes the rate of table movement from an intermittent or slow feed to a relatively rapid or traverse rate of movement and in a direction opposite to the previous feed movements, the levers 23, 36 and 38 remaining as previously positioned.

In setting up the machine with a new workpiece, trial cuts and adjustments of one kind or another are frequently made. With this end in view improved means have been provided, presently to be explained, for actuating the shafts 22, 34 or 56 manually in order that the operator may supervise, with greater care and accuracy, the initial cuts to be made.

With reference to Figs. 4 and 6 particularly, the outer end-portion of the rotary shaft 56 is provided with a bore 77 adapted to receive an arm or shaft 78 of the improved actuator 79. Operative engagement between the arm 78 and the shaft 56 is provided by clutch teeth 82 formed upon the end of the shaft and complemental clutch teeth 83 formed on the arm, thereby enabling the operator to manually revolve the rotary work-table 9.

Normally the clutch teeth 82 and 83 are adapted to be maintained disengaged thereby permitting the shaft 56 to be driven by the power means at a constant traverse rate or feed rate without spinning the handle 79 and endangering the operator. For this purpose, a spring pressed member 84, slidably mounted within an axial bore 86 in the arm 78 exerts pressure against the inner end of the bore 77 sufficient to disengage the clutch teeth whenever the lever is released. To prevent the force of the spring 87 from moving the handle 79 entirely off of the shaft 56, the actuator is provided with a groove 89, adapted to be engaged by a spring-pressed pin 91 that is held within a radially disposed bore of a circular collar 93. The pin 91 passes through an opening in the feed shaft so as to be engageable with the tubular portion 78 of the crank 79.

It is perceived that a given or definite rotation of the crank handle 79 will cause the rotary table 9 to be indexed at a definite or predetermined degree, and to enable the operator to turn the handle the required amount necessary for indexing the table a predetermined distance, a circular cup member 98, graduated at its periphery, is mounted upon the shaft 56 and is provided with a rim section completely circumscribing the circular collar 93. In order that the cup will normally rotate with the collar without slipping, resilient means, such as spring-pressed detents 99, mounted within bores 91 in the collar, exerts a constant pressure against the cup to cause the parts to rotate as a unit although the latter is capable of being manually turned without turning either the collar or the shaft. A portion of the external surface of the dial 98 is knurled in order that the manual adjustment of the cup, may be easily adjusted relative to the shaft to bring a predetermined graduation in line with the zero mark on the frame, from which further increments of movement imparted to the table can be calculated to a nicety.

Each of the drive shafts 22, 34 and 56 is provided with a similar end adapted to fit the actuator 79. This uniformity eliminates the requirement of a multiplicity of individual crank handles that serve only to confound the operator and impede his progress in turning out finished work-pieces quickly. In addition, the safety features incorporated in the detachable actuator automatically prevents the handle from being turned with the shaft and possible injury to the operator. As soon as the operator releases the handle, the same is declutched from the driven shaft, but remains secured thereto, and hangs stationary, accessible and always in the same position.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. In a machine tool having a plurality of manually actuable transmissions each including a shaft provided with an exposed end formed with a cylindrical bore and a series of clutch teeth; a single manual actuating element for all of said shafts comprising a portable crank having a cylindrical member projecting therefrom and adapted selectively to be fitted into said bores, said member also having clutch teeth complemental to the clutch teeth on said shafts; spring means carried by said member and adapted to engage a wall of said bores normally to hold said clutch teeth disengaged; and a detent device carried by each of said shafts to prevent accidental removal of said crank from said shafts.

2. In a machine tool having a plurality of manually actuable transmissions each including a shaft provided with an exposed end formed with a bore and a series of clutch teeth; a single manual actuating device for all of said shafts comprising a detachable and portable crank element having a portion adapted selectively to be inserted into the bores of said shafts, said crank element also having clutch teeth adapted to engage the clutch teeth of said shafts when said portion is completely inserted in said bore; spring means normally tending to disengage said clutch teeth; a collar secured to the exposed end of each of said shafts; detent means carried by each of said collars and adapted to engage said crank element to prevent accidental removal of said crank element from said shafts; and a graduated member frictionally secured upon the exposed end of each of said shafts to indicate the amount which the shaft is turned by said crank element.

3. In a shaping machine having a frame, a tool carrier reciprocably mounted thereon, power means for reciprocating said carrier, a cross-rail translatably mounted on said frame for movement toward or away from the plane of movement of said carrier, a work-support translatably mounted on said cross-rail, and a work table rotatably mounted on said work-support; a main power shaft; means for selectively giving to said shaft forward and reverse rotations at high and low speeds respectively; transmission mechanism driven by said power shaft for moving said work-support along said cross-rail; reversing means between said power shaft and said transmission mechanism; elevating mechanism for said cross-rail connected with said power shaft; reversing means in said elevating mechanism for changing the direction of movement of said rail independently of the first mentioned reversing means; means actuated from said main power shaft for rotating said work table; and a reverser embodied in said table rotating means for reversing the direction of rotation of said table independently of the movement of said power shaft and independently of the movement of said cross-rail and work-support.

4. In a shaping machine having a main frame, a cross-rail supported thereby and movable vertically thereon, a work-support translatably mounted on said cross-rail, and a work table rotatably mounted on said work-support; power means for effecting movements of said cross-rail, work-support and work table; including a main power shaft, a cross-rail elevating transmission, a work-support translating transmission, and a work table rotating transmission; an independently operable reversing mechanism in each of said transmissions for selectively effecting reversals thereof; and means for simultaneously changing the rate and direction of movement of said power shaft thereby simultaneously to vary the speed and direction of movement of said transmissions.

5. In a shaping machine having a main frame, a tool carrier reciprocably mounted thereon, a cross-rail translatably mounted on said frame, a work-support carried by said cross-rail and adapted to be moved therealong, and a work table rotatably mounted on said work-support; a main power transmission; individual branch line transmissions actuated from said main power transmission for translating said cross-rail on said frame, for translating said work-support on said cross-rail and for rotating said work table on said work-support; means to actuate said main power transmission in one direction at a high rate and in the opposite direction at a low rate; a lever controlling said rates and directions and adapted by its position to indicate the direction of movement of said work-support; and independently operable reversing means in each of said branch line transmissions for selectively changing the direction of movement imparted to said cross-rail, work-support and work table.

6. In a shaping machine having a main frame, a tool carrier reciprocably mounted thereon, a translatable work-support, a work table rotatably mounted on said work-support, mechanism for raising or lowering said work-support, mechanism for moving said support horizontally in reverse directions, and mechanism for rotating said work table; a main shaft for driving said three mechanisms; power means for imparting a predetermined rate of movement to said shaft in one direction and power means for imparting a different rate of movement to said shaft in the opposite direction; rate and direction control means for selectively rendering one of said power means effective; a control lever for one of said mechanisms adapted to indicate by its position the direction of movement to be imparted to said work-support when the said shaft is driven at one rate of speed; and a control lever for the other of said mechanisms adapted to indicate by its position the direction of movement to be imparted to said work-support when said shaft is driven at a different rate of speed.

7. In a shaping machine having a frame, a tool carrier reciprocable horizontally thereon, power means for reciprocating said tool carrier, a cross-rail translatably mounted on said frame for moving vertically thereon, a work-support carried by said rail and adapted for movement horizontally thereon, and a work table rotatably mounted on said work-support; a power transmission mechanism for imparting a continuous movement selectively to the cross-rail, the work-support or work table; power transmission mechanism for imparting intermittent movements selectively to the rail, the work-support or the work table in timed relation with the reciprocations of the tool carrier; means including a controller device common to both of said transmission mechanisms for rendering either transmission selectively effective to effect movement of said elements; and reversing means in said transmission mechanisms for changing the direction of movement of the element moved thereby.

8. In a shaping machine having a frame, a tool carrier reciprocable horizontally thereon, power means for reciprocating said carrier, a cross-rail translatably mounted on said frame for movement vertically thereon, a work-support carried by said rail and adapted for movement horizontally thereon, and a work table rotatably mounted on said work-support; a power transmission mechanism for imparting a continuous movement to the cross-rail, the work-support and the work table in one direction; power transmission mechanism for imparting intermittent movements to the cross-rail, the work-support and the work table in the opposite direction; reversing means including a controller element common to both of said transmission mechanisms for rendering either of said transmissions effective; and individual reversing means in said transmission mechanisms for changing the direction of movement of the element moved thereby independently of said first mentioned reversing means.

9. In a shaping machine having a frame, a tool-carrier translatably mounted thereon, power means for translating said tool carrier, a cross-rail translatably mounted on said frame for movement toward and away from the plane of movement of said tool carrier, a work-support carried by said cross-rail and adapted for translation therealong, and a work table rotatably mounted on said work-support; power means for effecting translatory movements of said cross-rail and work-support and rotation of said work table at rapid rates; means for effecting intermittent movements of said cross-rail, work-support and work table at a slow rate; main control means for changing both the rate and direction of movement of said cross-rail, work-support and work table; and auxiliary control means in each of said cross-rail and work-support translating means and in said work table rotating means for selectively and independently reversing the direction of movement of said elements.

10. In a shaping machine having a main frame, a horizontally reciprocable tool support mounted thereon, power means for reciprocating said tool support, a translatable work-support translatable vertically and horizontally on said frame, and a work table rotatably mounted on said work-support; a main power transmission; means for actuating said main power transmission selectively at high and low speeds and in forward and reverse directions; individual branch line transmissions receiving motion at high and low rates from said main power transmission for effecting respectively rotation of said work table and vertical and horizontal movements of said work-support at high and low rates; a single manually actuable device for selectively rendering said main transmission operative at high and low speeds and for simultaneously changing its direction of operation; and a motion reverser in each of said branch line transmissions.

11. In a shaping machine having a main frame, a cross-rail vertically movable thereon, a work-support mounted for horizontal movement on said cross-rail, and a work table rotatably mounted on said work-support; a main power transmission; means selectively to give to said transmission high speed rotations or step-by-step slow speed rotations; a first branch line transmission actuated from said main transmission and connected to move said work-support on said cross-rail at a rate determined by said main transmission; a reverser in said branch line transmission for changing the direction of movement of said work-support; a second branch line transmission actuated by said main power transmission and connected to move said cross-rail vertically on said frame; a reverser in said second branch line transmission for changing the direction of movement of said cross-rail; a third branch line transmission actuated from said main transmission for rotating said work table in accordance with the rotation of said main transmission; and a reverser in said third branch line transmission.

12. In a shaping machine having a main frame, a horizontally reciprocable tool-support mounted thereon, a translatable work-support carried by said frame, and movable horizontally and vertically relative thereto, a work table rotatably mounted on said work-support, and power means for reciprocating said tool support; a main power transmission; means selectively to give to said transmission high speed continuous rotations in one direction or step-by-step slow speed rotations in the opposite direction; individual branch line transmissions actuated from said main power transmission for effecting, respectively, vertical and horizontal movements of said work-support and rotation of said worktable at rates determined by said main transmission; and a motion reverser in each of said branch line transmissions.

WILLIAM F. ZIMMERMANN.